United States Patent [19]
Christenbery

[11] Patent Number: 5,252,997
[45] Date of Patent: Oct. 12, 1993

[54] VISUAL AID FOR NIGHT DRIVING

[76] Inventor: Charles R. Christenbery, Harpoon La., St. James City, Fla. 33956

[21] Appl. No.: 700,484

[22] Filed: May 15, 1991

[51] Int. Cl.$^5$ ............................................. G02C 7/16
[52] U.S. Cl. ...................................... 351/49; 351/45
[58] Field of Search ............... 351/44, 45, 49, 47–48

[56] References Cited

U.S. PATENT DOCUMENTS

| | | | |
|---|---|---|---|
| 2,358,602 | 9/1944 | Snyder | 351/45 |
| 2,511,776 | 6/1950 | Kelly | 351/45 |
| 2,796,610 | 6/1957 | Doorenbos | 351/45 |
| 3,111,675 | 11/1963 | Mora | 351/45 |
| 3,199,114 | 8/1965 | Malifaud | 351/45 |
| 3,890,037 | 6/1975 | Zingarelli | 351/49 |
| 4,012,129 | 3/1977 | Byler | 351/46 |
| 4,678,296 | 7/1987 | Smith | 351/45 |
| 4,828,380 | 5/1989 | Cherian | 357/45 |
| 4,955,709 | 9/1990 | Smith | 351/46 |

FOREIGN PATENT DOCUMENTS 368324  3/1963  Switzerland ...................... 351/45

*Primary Examiner*—Ronald J. Stern
*Assistant Examiner*—James Phan
*Attorney, Agent, or Firm*—Shefte, Pinckney & Sawyer

[57] ABSTRACT

A visual aid for nighttime driving of automobiles having an exterior side mounted rear vision mirror wherein a driver tends to be subjected to headlight glare directly from oncoming automobiles and headlight glare reflected by the mirror from following automobiles, having a frame, and a supporting assembly, including a glare reduction arrangement which includes a direct glare portion and a reflected glare portion for reduction of light transmission therethrough. A lens arrangement including the glare reduction arrangement and a frame mounted blocking portion of the glare reduction arrangement may also be used.

17 Claims, 2 Drawing Sheets

VISUAL AID FOR NIGHT DRIVING

BACKGROUND OF THE INVENTION

The present invention relates broadly to vision wear such as eyeglasses or sunglasses, and more particularly, to a visual aid for use during nighttime driving.

Driving at night can be a tedious, sometimes harrowing experience. Glare from oncoming traffic, as well as glare reflected in the mirrors from traffic approaching from the rear can be blinding, as well as aggravating. On busy highways, this glare can be an almost constant source of fatigue, headaches, and irritation. The problem can be compounded for drivers who wear prescription glasses because the headlight glare combined with the reflections on the front and back side of the prescription lenses can increase the overall debilitating effect. Also, contact lens wearers suffer from both the traffic glare and the drying effect of cool night air.

Currently, eyeglasses for night driving are typically glasses which are used for other purposes and adapted for night driving wear. Typical night driving glasses include a pink or yellow tint over the entire surface of the lens to reduce glare, and an anti-reflection coating on the inside surface of the lens to eliminate reflections on the lens surface itself. While these lenses are somewhat effective for night driving, they are at best an adaptation and do not fully address the problem of direct headlight glare and glare reflected in the rear vision mirrors, especially the outside rear vision mirror, from which glare can be particularly intense when being passed by an overtaking vehicle.

SUMMARY OF THE INVENTION

It is accordingly an object of the present invention to provide a visual aid for night driving which solves the aforementioned problems. Specifically, it is an object of the present invention to provide a visual aid for nighttime driving which reduces glare from the headlights of oncoming traffic, as well as glare reflected in the rear vision mirror from following and overtaking automobiles, without restricting the driver's use of the outside rear vision mirror.

The visual aid of the present invention is primarily adapted for nighttime driving of automobiles having an exterior side-mounted rear vision mirror, wherein a driver tends to be subjected to headlight glare directly from oncoming automobiles and headlight glare reflected by the mirror from following automobiles. Basically, the visual aid comprises a frame, glare reduction means supported by the frame, and an arrangement for supporting the frame forwardly of a driver's face with the glare reduction means disposed directly forwardly of the driver's eyes to define a viewing field for sight therethrough by the driver.

According to the present invention, the glare reduction means includes a first portion extending laterally across an intermediate region of the driver's viewing field when the visual aid is worn for reduction of direct glare from oncoming automobiles. The glare reduction means also includes a second portion extending vertically at one lateral side of the driver's viewing field when the visual aid is worn for reduction of mirror-reflected glare from following automobiles. The second glare reduction portion is preferably opaque. The glare reduction means covers only a portion of the driver's overall viewing field so that light transmission through the remainder of the viewing field is not substantially affected.

According to the preferred embodiment of the present invention, the second glare reduction portion of the glare reduction means is located in a lower left quadrant of the driver's viewing field when the visual aid is worn. The glare reduction means may be alternatively polarized or tinted or otherwise treated to reduce or eliminate glare.

As an optional feature, the frame may include a third glare reduction portion disposed laterally adjacent and transversely to the second glare reduction portion to extend rearwardly toward the driver's face when the visual aid is worn. The third glare reduction portion is preferably also opaque.

In one embodiment, the glare reduction means above is supported by the frame leaving the remainder of the driver's field of vision open and unobstructed. In an alternative embodiment of the present invention, a lens arrangement which includes the glare reduction means is supported by the frame. In the preferred embodiment, the frame assembly is configured as an eyeglass frame defining a pair of apertures for disposition forwardly of the driver's face when said visual aid is worn to define the driver's viewing field of sight, with either the glare reduction means alone or the combined lens arrangement and glare reduction means mounted therein.

Optionally, the visual aid may omit the first glare reduction portion and include only the second glare reduction portion or only the second and third glare reduction portions of the glare reduction means. A lens arrangement, including the second glare reduction portion, may also be utilized with this optional arrangement.

DESCRIPTION OF THE PREFERRED EMBODIMENT

Figure 1:
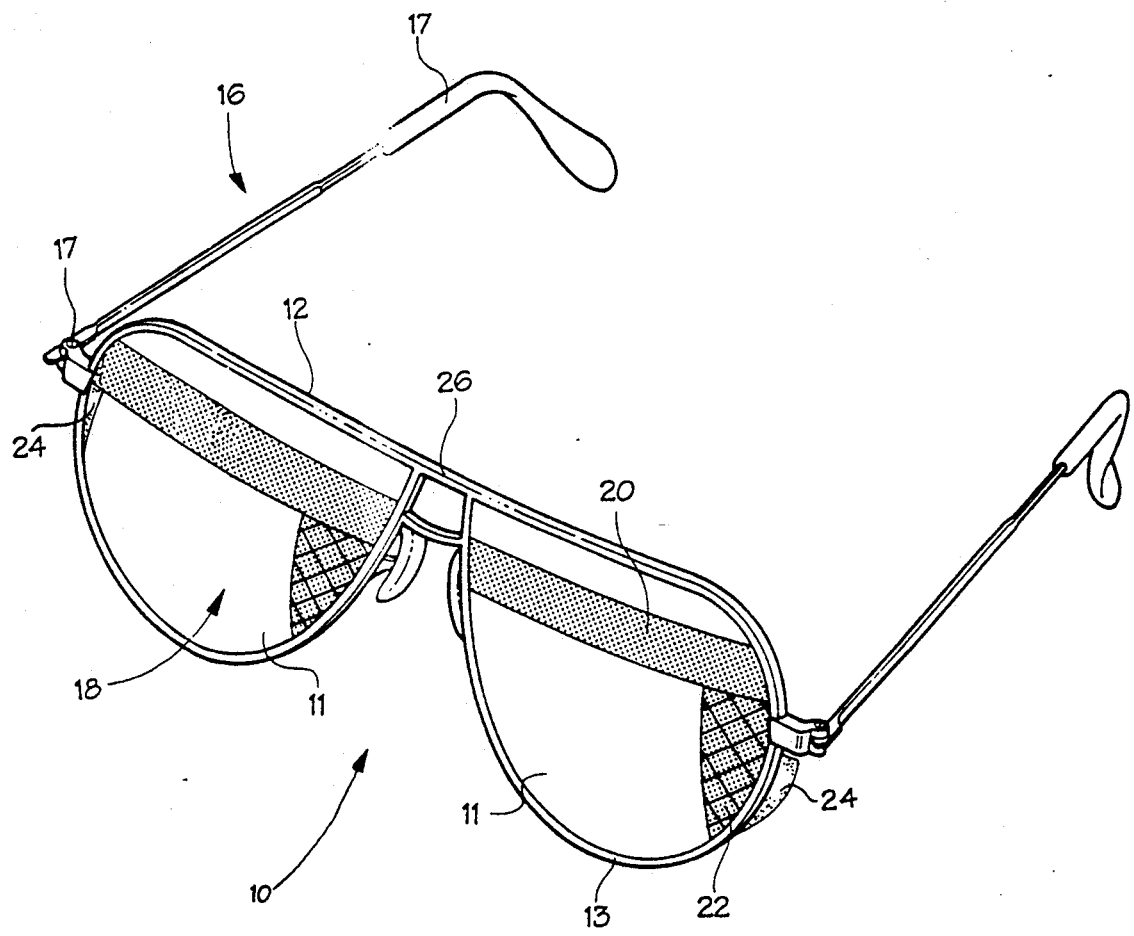
FIG. 1 is a perspective view of a visual aid according to one preferred embodiment of the present invention.

Referring now to the accompanying drawings and more particularly to FIG. 1, a visual aid for nighttime driving according to the preferred embodiment of the present invention is indicated generally at 10 and includes a frame 12 having two annular frame portions 13, each defining an opening 11, in a side-by-side relationship, joined by a bridge 26. The bridge 26 allows the frame 12 to traverse the face of the driver while resting the frame 12 on the bridge of the driver's nose. A supporting assembly 16 includes two elongated rods 17, commonly known as temple pieces, pivotably mounted respectively to the outward opposite sides of the frame portions 13 at a position closely adjacent the openings 11, using hinges 17. The supporting assembly 16 assists the bridge 26 to position and stabilize the visual aid assembly 10 on the head of the driver.

A glare reduction arrangement 18 is mounted within each opening 11. The glare reduction arrangement 18 consists of a first direct glare reduction portion 20 which laterally traverses an intermediate region of the surface of each opening 11 and reduces direct glare from the headlights of oncoming automobiles. A second reflected glare reduction portion 22 extends vertically downwardly from the first glare reduction portion 20 within a lower lateral quadrant of each opening 11 and serves to reduce or eliminate glare reflected by an exterior side vision automobile mirror from the headlights of automobiles approaching generally from the driver's rear. Generally, the reflected glare portion 22 is positioned within the driver's left-hand side of each opening 11 for reduction of glare from the left-hand exterior rear vision mirror. It should be noted that for drivers in countries wherein vehicles are required to travel on the left side of the roadway, glare will be reflected from an exterior mirror on the right-hand side of the automobile, therefore the reflected glare portion 22 may be located within the right-hand portion of each opening 11. The first glare reduction portion 20 is tinted, preferably polarized, but may be tinted or otherwise treated to reduce glare, while the second glare reduction portion 22 is preferably opaque to completely block light transmission in the peripheral area of the driver's field of vision likely to be disturbed by the mirror-reflected glare from the headlights of traffic approaching generally from the rear, but optionally the second glare reduction portion 22 could be polarized, tinted, or otherwise treated for glare-reduced light transmission.

To supplement the second reflected glare reduction portion 22 of the glare reduction arrangement 18, a blocking portion 24 may be mounted on or formed as a part of the lateral side of the frame 12 from which reflected glare is expected. The blocking portion 24 is disposed laterally adjacent and transversely to the second glare reduction portion 22 to extend rearwardly toward the driver's face when the visual aid is worn. The blocking portion 24 is also preferably opaque.

Figure 2:
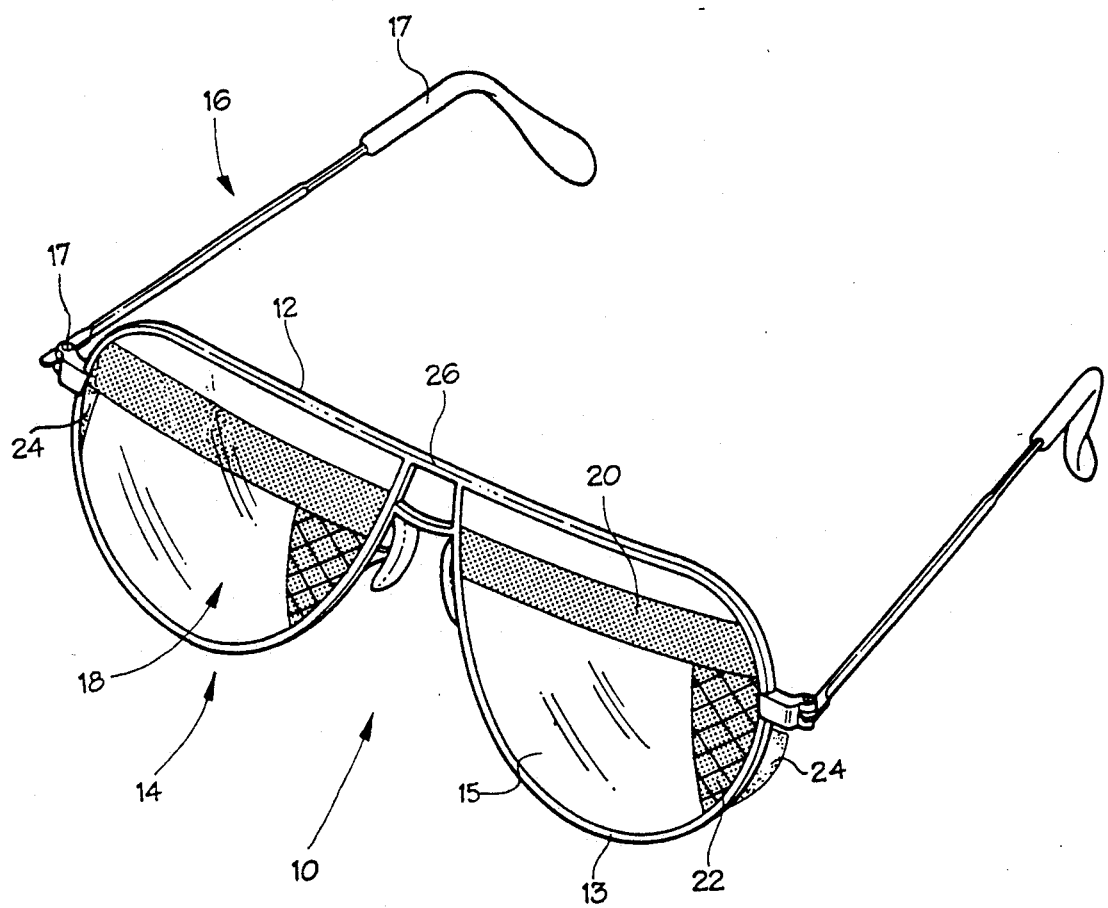
FIG. 2 is a perspective view of a visual aid according to an alternative embodiment of the present invention.

An alternative embodiment is shown in FIG. 2 wherein the openings 11 in the frame portions 13 have a pair of lenses 15 mounted therein, with the glare reduction arrangement 18 being incorporated into the lenses 15. Otherwise, the visual aid 10 is substantially the same as depicted in FIG. 1 and as above described. As a further variation, the first glare reduction portion 20 could be eliminated from either of the embodiments of FIGS. 1 and 2, leaving only the second glare reduction portion 22 alone or in combination with the blocking portion 24 to reduce or eliminate glare reflected by the exterior side view mirror.

In operation, the driver, when confronted with nighttime glare, places the visual aid 10 of the present invention on his or her head in the manner of normal eyeglasses. The first direct glare reduction portion 20 of the glare reduction arrangement 18 will then be located directly in front of his or her eyes. When faced with the glare of oncoming traffic, the driver, looking forwardly through the direct glare portion 20 of the glare reduction arrangement 18, thus receives reduced light transmission. Glare reflected from the exterior rear vision mirror generally interferes with the driver's peripheral field of vision. The reflected glare portion 22 of the glare reduction arrangement 18, either in combination with the blocking portion 24 or alone, acts to totally block or at least reduce light transmission within the portion of the driver's peripheral field of vision associated with the exterior mirror. As such, the visual aid of the present invention acts to greatly reduce the fatigue, aggravation, and danger produced by the glare from the headlights of oncoming and overtaking traffic when driving at night.

It should be noted that while the present invention has been illustrated and described as preferably embodied in a pair of eyeglasses, it is also contemplated that the glare reduction arrangement can be incorporated into any number of similar visual aids, such as, for example but without limitation, clip-on lenses, in the manner of conventional clip-on sunglasses, monocle, opera glasses or on a lens assembly projecting downwardly from the bill of a cap.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A visual aid for nighttime driving of automobiles having an exterior side-mounted rear vision mirror wherein a driver tends to be subjected to headlight glare directly from oncoming automobiles and headlight glare reflected by the mirror from following automobiles, said visual aid comprising a frame, glare reduction means supported by said frame, and means for supporting said frame forwardly of a driver's face with said glare reduction means disposed forwardly of the driver's eyes within the driver's overall viewing field of sight, said glare reduction means including a first portion disposed to extend laterally across an intermediate region of the driver's viewing field directly forwardly of the driver's eyes when said visual aid is worn for reduction of headlight glare directly from oncoming automobiles and a second portion separate and distinct from said first portion disposed to extend only within a peripheral portion of the driver's viewing field when said visual aid is worn and being opaque for totally blocking light transmission therethrough of mirror-reflected glare from following automobiles, said glare reduction means being arranged to cover only a portion of the driver's overall viewing field without substantially affecting light transmission through the remainder of the viewing field.

2. The visual aid according to claim 1 wherein lens means are supported by said frame for viewing therethrough, said lens means including said glare reduction means.

3. The visual aid according to claim 1 wherein said second glare reduction portion of said glare reduction means is disposed to be located in a lower quadrant of the driver's viewing field when said visual aid is worn.

4. The visual aid according to claim 1 wherein said glare reduction means includes means for polarizing light.

5. The visual aid according to claim 1 wherein said glare reduction means includes tinting means.

6. The visual aid according to claim 1 wherein said glare reduction means includes a third portion disposed laterally adjacent and transversely to said second glare reduction portion to extend rearwardly toward the driver's face when said visual aid is worn.

7. The visual aid according to claim 6 wherein said third glare reduction portion is opaque to totally block light transmission therethrough.

8. The visual aid according to claim 1 wherein said frame means defines a pair of apertures for disposition forwardly of the driver's face when said visual aid is worn to define the driver's viewing field of sight, said glare reduction means being mounted to said frame within said apertures.

9. The visual aid according to claim 8 wherein said first glare reduction portion extends laterally across each said aperture.

10. The visual aid according to claim 8 wherein said second glare reduction portion is disposed at one lateral side of each said aperture.

11. A visual aid according to claim 8 wherein said glare reduction means includes a third portion extending from said frame outwardly adjacent one said aperture and laterally adjacent and transversely to said second glare reduction portion to extend rearwardly toward the driver's face when the visual aid is worn.

12. A visual aid according to claim 11 wherein said third glare reduction portion is opaque.

13. A visual aid for nighttime driving of automobiles having an exterior side-mounted rear vision mirror wherein a driver tends to be subjected to headlight glare directly from oncoming automobiles, said visual aid comprising a frame, glare reduction means supported by said frame, and means for supporting said frame forwardly of the driver's eyes within the driver's overall viewing field of sight, said glare reduction means including a portion disposed to extend only within a peripheral portion of the driver's viewing field when said visual aid is worn and being opaque for totally blocking light transmission therethrough of mirror-reflected glare from following automobiles without substantially affecting light transmission through the remainder of the viewing field.

14. A visual aid according to claim 13 wherein lens means are supported by said frame for viewing therethrough, said lens means including said glare reduction means.

15. A visual aid according to claim 13 wherein said glare reduction means is disposed to be located in a lower quadrant of the driver's viewing field when said visual aid is worn.

16. The visual aid according to claim 13 wherein said glare reduction means includes an additional portion disposed laterally adjacent and transversely to said first-mentioned glare reduction portion to extend rearwardly toward the driver's face when said visual aid is worn.

17. A visual aid according to claim 16 wherein said additional glare reduction portion is opaque.

* * * * *